June 25, 1957 F. W. COPLESTON 2,797,301
WELDING TORCHES
Filed Dec. 5, 1955
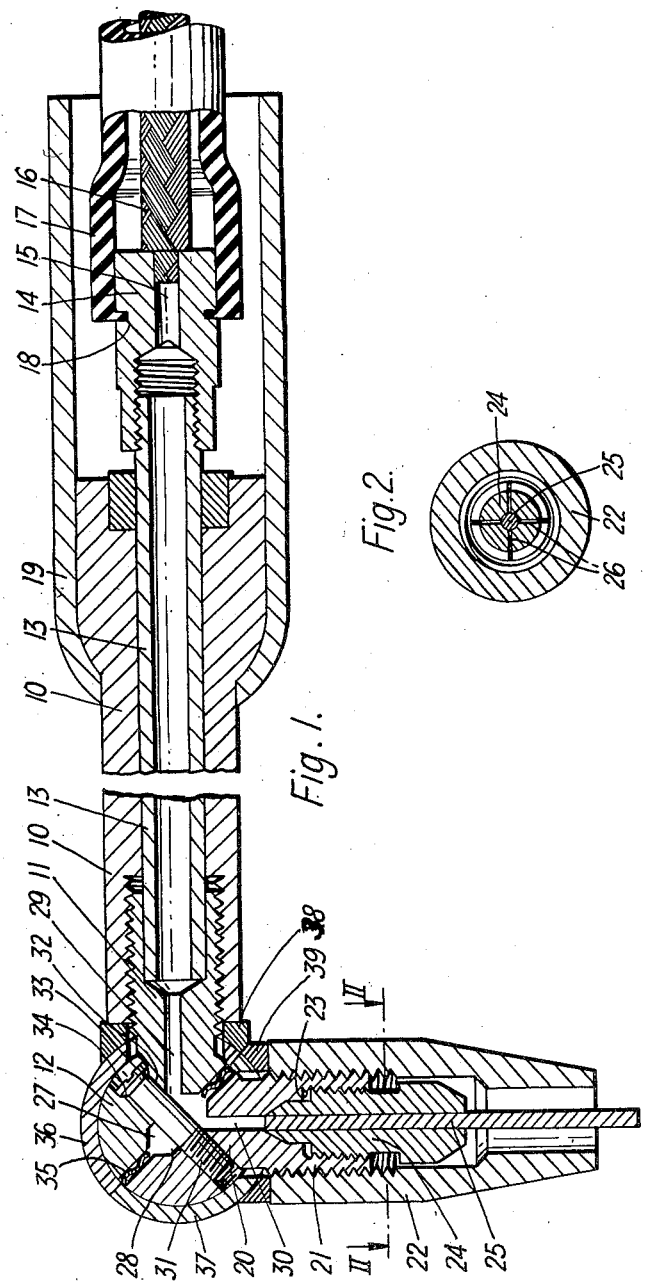
Inventor
FRANCIS WILLIAM COPLESTON
By
Attorney

United States Patent Office 2,797,301
Patented June 25, 1957

2,797,301

WELDING TORCHES

Francis William Copleston, London, England, assignor to The British Oxygen Company Limited, a British company Application December 5, 1955, Serial No. 551,140

Claims priority, application Great Britain December 17, 1954

7 Claims. (Cl. 219—75)

The present invention relates to welding torches having an internal conduit for the passage of an inert gas or a fuel gas, and a nozzle unit for directing a stream of the inert gas or the flame resulting from the combustion of the fuel gas upon a workpiece to be welded. The invention is, however, particularly suitable for application to an Argonarc welding torch having an electrode for establishing an electric arc and a nozzle unit for directing a stream of argon gas around the electric arc.

In prior known welding torches the nozzle unit is rigidly secured at a fixed angle to the handle or body, and the operation of such torches may be difficult where access to the workpiece is obstructed by other components or by reason of the particular shape of the workpiece. In such circumstances it has been necessary to use a range of welding torches each having its nozzle unit fixed at a different angle to its body.

The object of the invention is to provide an improved welding torch suitable for operation in circumstances where access to the workpiece is limited.

According to the invention there is provided a welding torch comprising a body portion, a nozzle unit and clamping means for mounting the nozzle unit upon the body portion, the body portion and the nozzle unit each having an internal conduit for the passage of gas and an annular sealing surface inclined at an acute angle to the longitudinal axis of the body portion and nozzle unit respectively, the two annular sealing surfaces co-operating to provide a gas tight joint between the two conduits and being angularly adjustable to preset the angle of the longitudinal axis of the nozzle unit relative to the body unit, and the said clamping means serving to hold the annular sealing surfaces in abutting contact.

The body portion may conveniently comprise a tube secured at one end to the convex surface of a hemispherical element, the element being offset so that its plane surface lies at an acute angle to the longitudinal axis of the tube. The nozzle unit may then comprise a nozzle the base of which is secured to the convex surface of a similar hemispherical element which is also offset so that its plane surface lies at an acute angle to the longitudinal axis of the nozzle. The centre portion of the plane surface of each element has a circular recess and a conduit effects communication between the interior of the tube, or the nozzle as the case may be, and the circular recess. The plane surfaces of the two elements are clamped together by a screw located in a passageway extending diametrically through the two elements and perpendicularly to the plane surfaces, the head of the screw engaging a shoulder adjacent the convex surface of one of the elements and the thread of the screw engaging a screw thread on the walls of the passageway in the other element.

The invention will now be more particularly described with reference to the accompanying drawings in which:

Figure 1 is a longitudinal cross-section of an Argonarc welding torch according to the invention; and Figure 2 is a cross-section along the line II—II of Figure 1.

The torch comprises a body portion and a nozzle unit. The body portion comprises a tube 10 of electrically non-conducting material one end of which is internally threaded to receive an externally threaded spigot 11 projecting from and integral with a hemispherical element 12 made of steel, copper, brass or other electrically conducting material, the spigot 11 being so positioned on the element 12 that the plane face of the latter is at angle of 45° with the axis of the tube 10. Within the tube 10 is co-axially fitted a tube 13 of copper or other electrically conducting material, the end of the tube 13 adjacent to the nozzle unit being press fitted within a cylindrical recess in the end of spigot 11. The other end of the tube 13 projects beyond the end of the tube 10 and is externally threaded to screw into an internally threaded recess in one end of a connecting member 14 of electrically conducting material. The other end of the member 14 is slotted at 15 to receive the end of a copper cable 16 which is adapted to be connected to a source of welding current. The cable 16 is housed within a flexible tube 17 (which may be of polyvinyl chloride or other flexible electrically-insulating material) the end of which fits over the end of the end of member 14 and is anchored by an internal flange which fits into a groove 18 in the outer surface of the member 14. The tube 17 also serves to carry shielding gas to the nozzle as hereinafter described. The end of the tube 10 adjacent the member 14 is provided with a projecting tubular casing 19 of insulating material which encloses and protects member 14.

The nozzle unit comprises a second hemispherical element 20, the plane surface of which mates with that of the first hemispherical element 12. The element 20 is also provided with a projecting cylindrical spigot 21, the axis of which is at an angle of 45° to the plane face of the element 20. The element 20 and spigot 21 are integral and are made of copper, steel or other electrically conducting material. The spigot 21 is externally threaded to receive a nozzle 22 of a non-metallic heat resisting material, such as "Cordex" (registered trademark) and has a screw threaded recess 23 to receive a split collet 24 which is adapted to hold an electrode 25, which may be a tungsten rod, coaxially with the nozzle 22, the end of the electrode 25 extending through the mouth of the nozzle 21. The collet 24 is provided with a series of slots 26 in known manner.

The plane faces of the hemispherical elements 12 and 20 are provided with circular recesses 27, 28 respectively and ducts 29, 30 lead from the recesses 27, 28 to the interior of tube 13 and recess 23 respectively.

The elements 12 and 20 are clamped together by a screw 31 located in a passageway 32 extending diametrically through the two elements and perpendicularly to the plane surfaces thereof, the head 33 of the screw 31 engaging a shoulder 34 adjacent the convex surface of the element 12 and the thread of the screw 31 engaging a screw thread on the walls of the passageway 32 in the element 20. An annular spring washer 35 is located between the plane surfaces of elements 12 and 20 to assist in effecting a gas-tight joint between recesses 27 and 28 to effect good electrical contact between the plane face of elements 12 and 20 and to permit adjustment of the nozzle unit without resorting to slackening of screw 31.

The two hemispherical elements 12 and 20 are covered by caps 36 and 37 of insulating material and bushes 38 and 39 are positioned between cap 36 and tube 10 and between cap 37 and nozzle 22 respectively.

In operation the electric current is fed from cable 16 through member 14 to tube 13 and thence through spigot 11, element 12, element 20, spigot 21, and collet 24 to the electrode 25. Shielding gas passes from tube 17 through the slots 15 in member 14 to the interior of tube 10 and thence through duct 29, circular recesses 27, 28, duct 30, and slots 26 to the interior of nozzle 22. The shielding gas is therefore in contact with the electric conductors and thereby dissipates part of the heat generated by the electric current in the conductors. Moreover, this preheating of the gas by the electric conductors improves the efficiency of the welding operation.

Before welding is commenced, the nozzle unit is set with its axis at any desired angle between 0 and 90° relative to the axis of the body portion, adjustment without slackening of the screw 31 being possible by virtue of the presence of the spring washer 35 between the two plane faces of the hemispheres 12 and 20. The degree of compression imparted to the spring by the screw 31 must of course be sufficient to ensure maintenance of the desired adjusted position during the welding operation.

I claim:

1. A welding torch comprising a body portion, a conduit within said body portion, an annular sealing surface associated with said body portion inclined at an acute angle to the longitudinal axis thereof, a nozzle unit, a conduit within said nozzle unit, an annular sealing surface associated with said nozzle unit inclined at an acute angle to the longitudinal axis thereof, an annular spring washer disposed between said two annular sealing surfaces, said two annular surfaces and said annular spring washer being adapted to cooperate to provide a gas-tight joint between said conduits, and clamping means adapted to hold said annular sealing surfaces and said annular spring washer in gas-tight relationship with said annular sealing surfaces but allowing adjustment of the relative angular position of said annular sealing surfaces without slackening of the clamping means.

2. A welding torch comprising a body portion, a conduit within said body portion, a hemispherical element having a convex surface mounted on said body portion in such manner that the plane surface of said element is at an acute angle to the longitudinal axis of said body portion, a radial conduit within said element in communication with said conduit within said body portion, a nozzle unit, a second hemispherical element having a convex surface mounted on said nozzle unit in such manner that the plane surface of said second element is at an acute angle to the longitudinal axis of said nozzle unit, a radial conduit in said second element in communication with said conduit in said nozzle unit, an annular spring washer disposed between said plane surfaces, said plane surfaces of said two hemispherical elements and said annular spring washer being adapted to co-operate to provide a gas-tight joint between said radial conduits, and clamping means for holding said plane surfaces and said annular spring washer in gas-tight relationship with said annular sealing surfaces but allowing adjustment of the relative angular position of said annular sealing surfaces without slackening of the clamping means.

3. A welding torch according to claim 2 wherein said clamping means comprises a screw located in a passageway extending diametrically through the two elements and perpendicularly to the plane surfaces thereof, said screw engaging both said elements in such manner to hold the plane surfaces thereof in abutting contact.

4. A welding torch according to claim 3 wherein the head of said screw engages a shoulder adjacent to the convex surface of one of said elements and the thread of said screw engages a screw thread formed on the walls of the passageway in the other of said elements.

5. A welding torch for use in gas shielded arc welding comprising a body portion, a conduit within said body portion, a first element of electrically-conductive material provided with an integral spigot mounted on said body portion, an annular sealing surface on said element inclined at an acute angle to the axis of the spigot, a conduit in said first element in communication with said conduit within said body portion, a second element of electrically-conductive material provided with a second integral spigot, an annular sealing surface on said second element inclined at an acute angle to the axis of the second spigot, a nozzle mounted on said second spigot, a conduit within said second element in communication with the interior of said nozzle, an annular spring washer disposed between said sealing surfaces, said annular sealing surfaces and said annular spring washer being adapted to co-operate to provide a gas-tight joint between said first and second elements, clamping means adapted to hold said annular sealing surfaces and said annular spring washer in gas-tight relationship but allowing adjustment of the relative angular positions of said annular sealing surfaces, without slackening of the clamping means, a first sleeve member of insulating material shielding the surface of the first element which would otherwise be exposed, and a second sleeve member shielding the surface of the second element which would otherwise be exposed.

6. A welding torch according to claim 5 wherein said clamping means comprises a screw located in a passageway extending diametrically through the two elements and perpendicularly to the plane surfaces thereof, said screw engaging both said elements in such manner to hold the plane surfaces thereof in abutting contact.

7. A welding torch according to claim 6 wherein the head of said screw engages a shoulder adjacent to the convex surface of one of said elements and the thread of said screw engages a screw thread formed on the walls of the passageway in the other of said elements.

References Cited in the file of this patent

UNITED STATES PATENTS

| | | |
|---|---|---|
| 478,417 | Drew | July 5, 1892 |
| 695,022 | Albertson | Mar. 11, 1902 |
| 2,371,945 | Barbeck | Mar. 20, 1945 |
| 2,376,265 | Meredith | May 15, 1945 |
| 2,468,808 | Drake | May 3, 1949 |